United States Patent
Nam et al.

(10) Patent No.: US 8,197,656 B2
(45) Date of Patent: Jun. 12, 2012

(54) DEVICE FOR SEPARATING MICRO PARTICLES AND A METHOD FOR FABRICATING THE DEVICE

(75) Inventors: Yun Woo Nam, Yongin-si (KR); Jung Joo Hwang, Suwon-si (KR); Hyo-Il Jung, Seoul (KR); Hui-Sung Moon, Seoul (KR); Jae Chan Park, Yongin-si (KR); Jun Il Sohn, Yongin-si (KR); Kyoung Ho Kang, Yongin-si (KR)

(73) Assignees: Samsung Electronics Co., Ltd., Yeongtong-gu, Suwon-si, Gyeonggi-do (KR); Industry-Academic Cooperation Foundation, Yonsei University, Sinchon-dong, Seodaemun-gu, Seoul (KR)

( * ) Notice: Subject to any disclaimer, the term of this patent is extended or adjusted under 35 U.S.C. 154(b) by 899 days.

(21) Appl. No.: 12/098,870

(22) Filed: Apr. 7, 2008

(65) Prior Publication Data
US 2009/0139866 A1   Jun. 4, 2009

(30) Foreign Application Priority Data
Nov. 30, 2007   (KR) ...................... 10-2007-0123785

(51) Int. Cl.
*G01N 27/26*   (2006.01)
(52) U.S. Cl. ........ 204/547; 204/600; 204/450; 204/643; 204/635; 435/4

(58) Field of Classification Search .......... 204/450–454, 204/547, 600–604, 643, 635; 422/502–509; 435/4, 5
See application file for complete search history.

(56) References Cited

U.S. PATENT DOCUMENTS

| | | | |
|---|---|---|---|
| 6,596,143 B1 * | 7/2003 | Wang et al. | 204/547 |
| 6,749,736 B1 * | 6/2004 | Fuhr et al. | 204/643 |
| 7,138,269 B2 | 11/2006 | Blankenstein | |
| 2006/0093488 A1 * | 5/2006 | Wong et al. | 417/48 |
| 2006/0152708 A1 | 7/2006 | Muller et al. | |
| 2006/0177815 A1 * | 8/2006 | Soh et al. | 435/4 |
| 2006/0289341 A1 | 12/2006 | Muller et al. | |
| 2006/0290745 A1 * | 12/2006 | Feng et al. | 347/65 |

FOREIGN PATENT DOCUMENTS
JP   2000-125846   5/2000
JP   2007-006858   1/2007

* cited by examiner

*Primary Examiner* — Jeffrey T Barton
*Assistant Examiner* — Jennifer Dieterle

(57) ABSTRACT

A device for separating micro particles is provided. The separating device comprises a sample inlet into which a sample containing micro particles is injected; fluid inlets into which fluid is injected to form a flow sheath for the sample; a plurality of outlets through which the micro particles are separated and discharged out; a channel through which the sample and the fluid flow; and a first electrode and a second electrode longitudinally disposed in parallel in the channel. The first and the second electrodes are provided in such a manner that an electrode gap between the first and the second electrodes has a curved shape. The micro particles in the sample are easily separated using a dielectrophoresis characteristic.

20 Claims, 12 Drawing Sheets

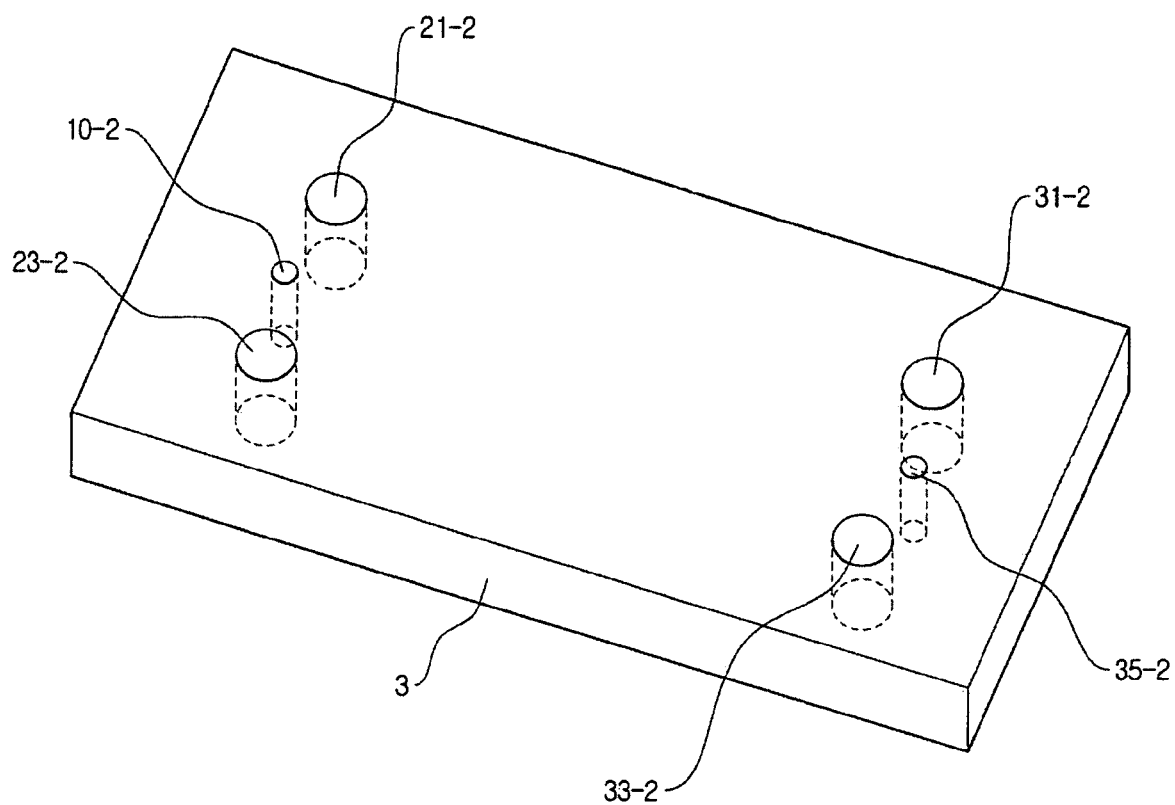

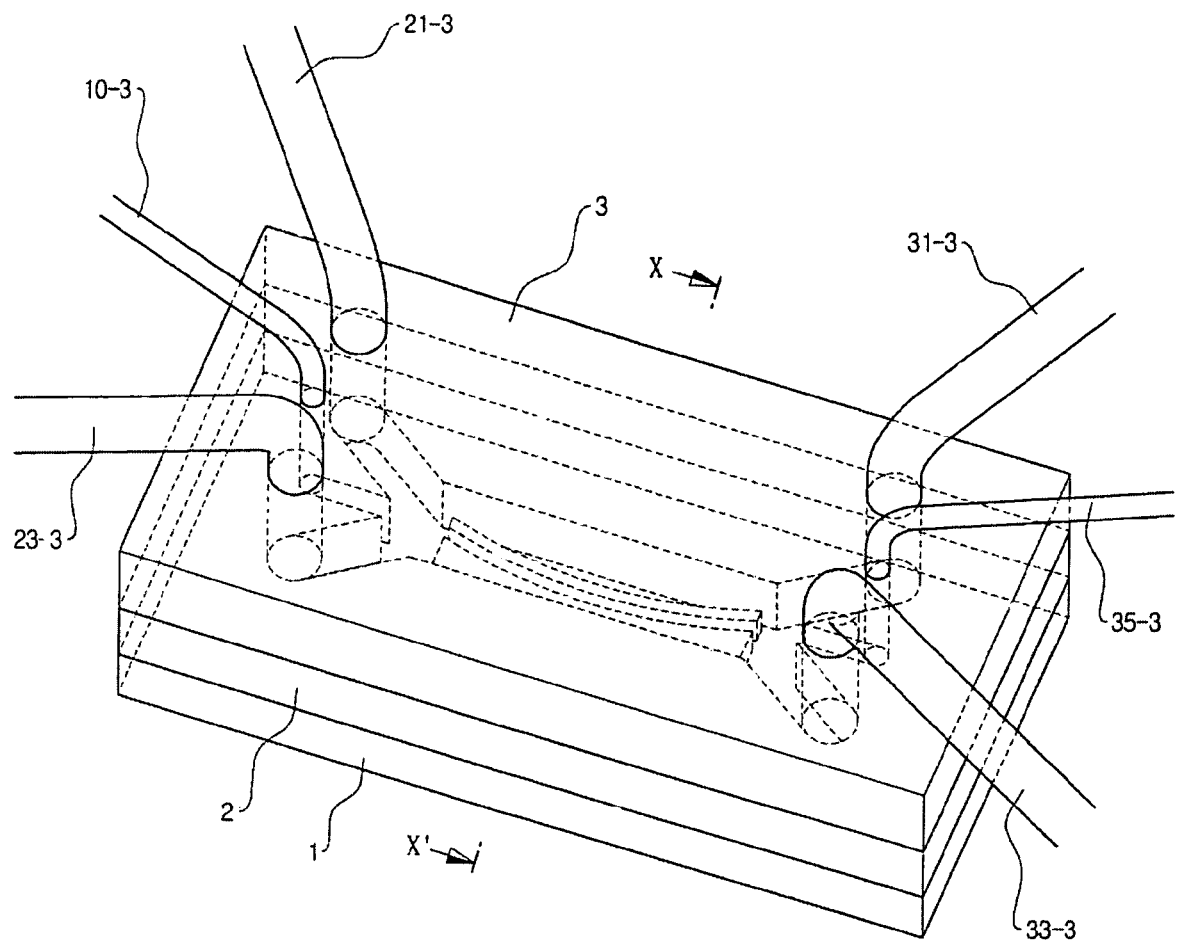

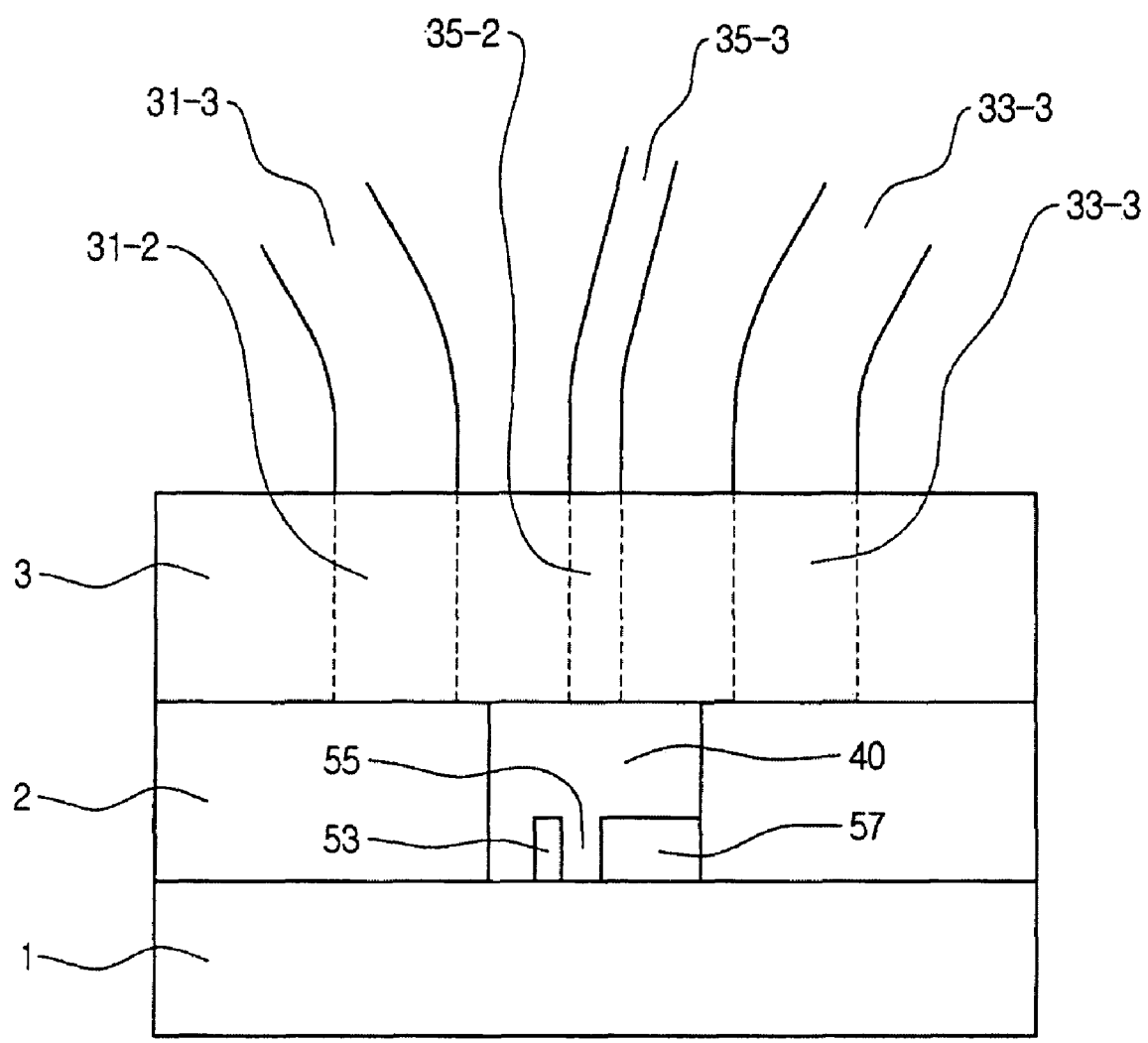

DEVICE FOR SEPARATING MICRO PARTICLES AND A METHOD FOR FABRICATING THE DEVICE

CROSS-REFERENCES TO RELATED APPLICATIONS

The present invention claims priority of Korean patent application No. 10-2007-0123785 filed on Nov. 30, 2008, which is incorporated by reference in its entirety.

BACKGROUND OF THE INVENTION

1. Field of the Invention

The present invention relates to a device for separating micro particles and a method for fabricating the device. More particularly, the present invention relates to a device for separating micro particles, such as microorganisms, in a sample and a fabricating method thereof.

2. Description of the Related Art

Upon analyzing the microorganisms in a sample obtained from atmosphere, water or soil, if dusts or others exist in the sample to be analyzed, these dusts cause noises: upon analyzing. In this case, an analysis for the microorganisms may result in degradation in reliability.

In particular, if there are several kinds of microorganisms and other organic or inorganic particles together in a sample, it is possible to carry out a quantitative analysis to a specified microorganism only after separating the microorganisms from the sample before the analysis.

Thus, it needs to develop a device for easily separating specified micro particles from a sample containing many kinds of micro particles such as microorganisms, dusts and others.

SUMMARY OF THE INVENTION

The present invention is to provide a device for easily separating specified micro particles from a sample containing diverse kinds of micro particles.

Further, the present invention is to provide a method of fabricating the above separating device.

In accordance with an aspect of the present invention, there is provided a device for separating micro particles, comprising: a sample inlet into which a sample containing micro particles is injected; fluid inlets into which fluid is injected to form a flow sheath for the sample; a plurality of outlets through which the micro particles are separated and discharged out; a channel through which the sample and the fluid flow; and a first pair of electrodes comprising a first electrode and a second electrode longitudinally disposed in parallel in the channel.

Here, the first and second electrodes are provided in such a manner that an electrode gap between the first and the second electrodes has a curved shape.

In accordance with another aspect of the present invention, there is provided a method of fabricating a separating device for micro particles, the method comprising the steps of: (a) forming a first pair of electrodes comprising a first electrode and a second electrode on a first substrate; (b) forming, on the first substrate, a channel layer having a sample inlet into which a sample containing micro particles is injected, fluid inlets into which fluid is injected to form sheath for the sample, a plurality of outlets through which the micro particles are separated and discharged out, and a channel through which the sample and the fluid flow; and (c) placing a second substrate on the channel layer and bonding the second substrate and the channel layer together.

In the step (a), the first and the second electrodes are longitudinally disposed in parallel in the channel and are provided in such a manner that an electrode gap between the first and the second electrodes has a curved shape.

In accordance with further aspect of the present invention, there is provided a method of separating micro particles in a sample, comprising the steps of: (a) flowing a sample containing micro particles into a channel; (b) flowing fluid along both longitudinal sides of the channel to form sheaths along the channel so as to form a flow path of the sample in the channel; (c) applying an electric field between a first electrode and a second electrode, both the electrodes being longitudinally disposed in parallel in the channel such that confronting faces thereof are curved. The method of separating micro particles in sample according to the invention may further comprises: (d) collecting the micro particles flowing along a path of a gap between the first and the second electrodes; or (e) collecting, at the end of the second electrode, the micro particles flowing toward the second electrode; or (f) collecting the micro particles flowing along the flow path of the sample formed in the step (b).

BRIEF DESCRIPTION OF THE DRAWINGS

The above and other objects, features and advantages of the present invention will be more apparent from the following detailed description taken in conjunction with the accompanying drawings, in which:

FIGS. 6A to 6E are views illustrating a method of fabricating the separating device according to the first embodiment of the present invention;

FIG. 7 is a sectional view taken along line X-X' of the separating device shown in FIG. 6E;

DETAILED DESCRIPTION OF THE EXEMPLARY EMBODIMENTS

Hereinafter, exemplary embodiments of the present invention will be described with reference to the accompanying drawings. The present invention, however, is not limited to the embodiments below.

Figure 1A:
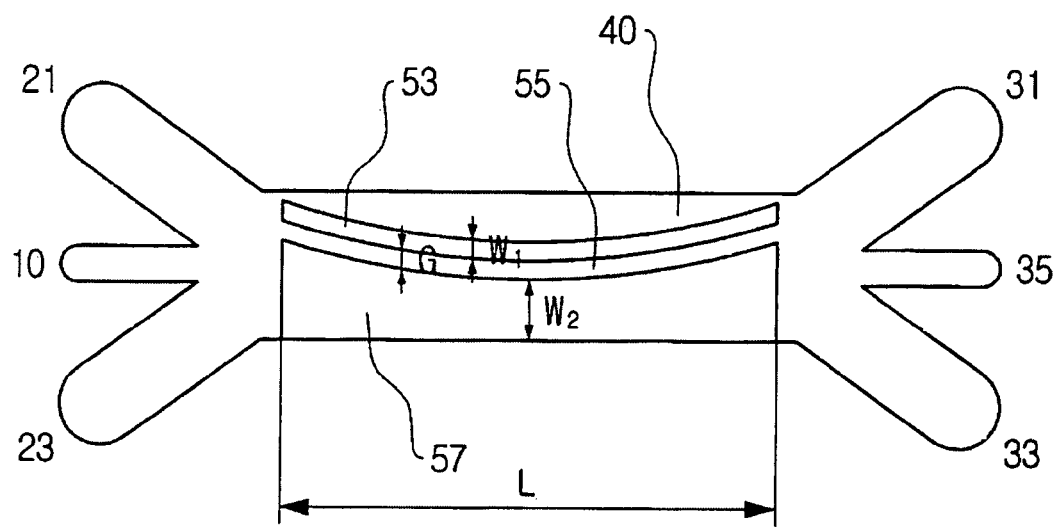
FIGS. 1A and 1B are a plan view and a perspective view of a separating device of micro particles according to a first embodiment of the present invention, respectively.
Figure 1B:
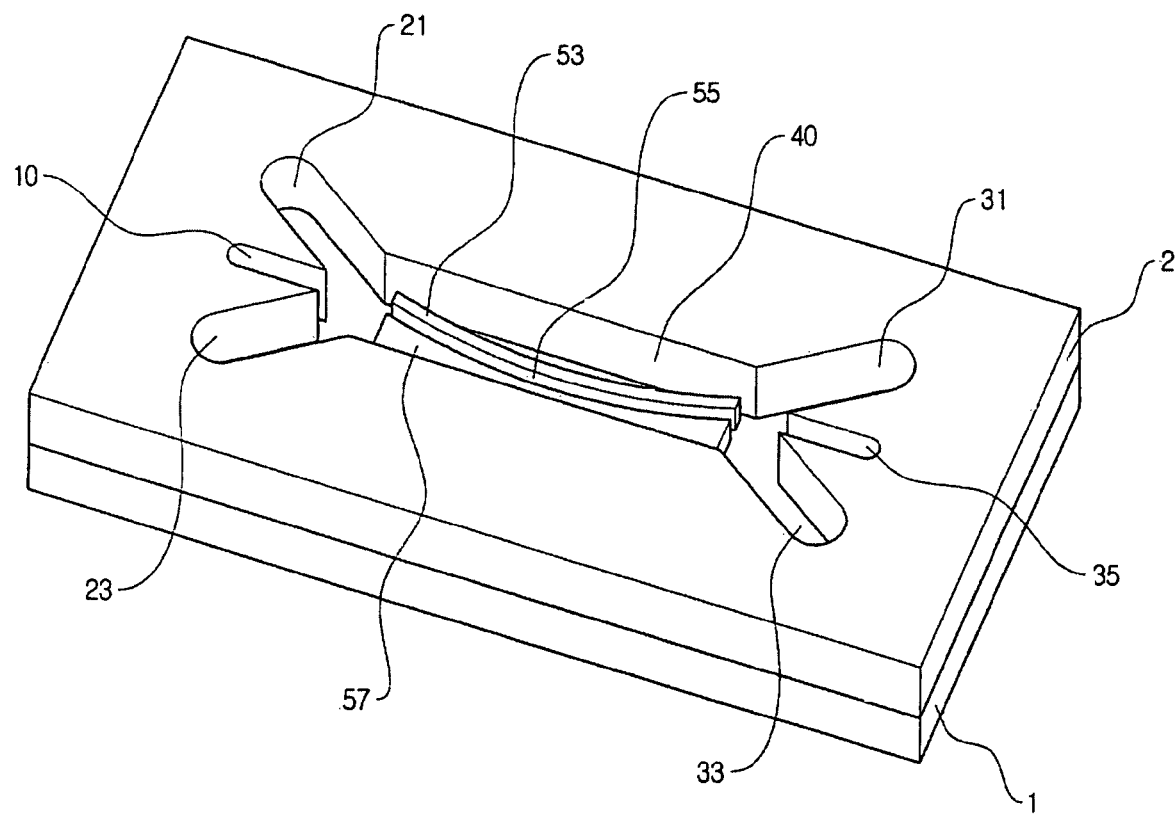

FIGS. 1A and 1B are a plan view and a perspective view of a separating device of micro particles according to a first embodiment of the present invention, respectively.

The separating device includes a sample inlet 10 into which a sample containing micro particles is injected; a first fluid inlet 21 and a second fluid inlet 23 into which fluid is injected to form a flow sheath for the sample; first, second, and third outlets 31, 33, and 35 through which the micro particles are separated and discharged out; a channel 40 through which the sample and the fluid flow; and a first electrode 53 and a second electrode 57 longitudinally disposed in parallel in the channel 40.

Here, the first and second electrodes 53 and 57 are provided curved in such a manner that an electrode gap 55 between the first and second electrodes 53 and 57 has a curved shape. That is, the confronting faces of the first electrode 53 and the second electrode 57 are curved in parallel.

The first and second electrodes 53 and 57 may be installed on the bottom of the channel 40. The separating device may be fabricated in such a way that the first and second electrodes 53 and 57 are formed on a lower substrate 1, and a channel layer 2 is formed such that the channel 40, the sample inlet 10, the fluid inlets 21 and 23, and the outlets 31, 33 and 35 are provided on the lower substrate 1. The fabricating method will be described later.

Dimensions, such as a width W1, W2, a length L, and a width G of the gap between the electrodes of the first and second electrodes 51 and 53 can be properly determined in consideration of a flow rate of the sample containing the particle to be separated, a depth and a width of the channel and others.

The channel preferably has dimensions of a height between 10 μm and 100 μm, a width between 200 μm and 2 mm, and a length between 5 mm and 20 mm.

Figure 2:
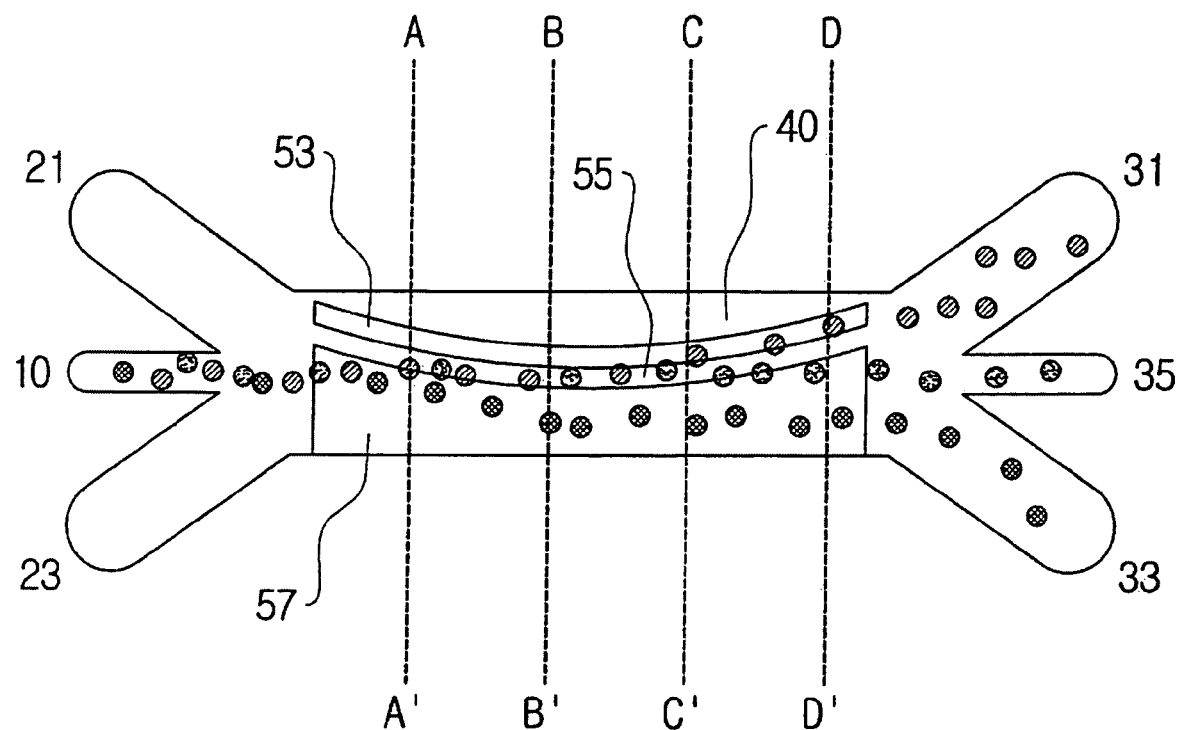
FIG. 2 is a view illustrating a procedure of separating micro particles in a sample using a separating device according to the present invention.
Figure 3:
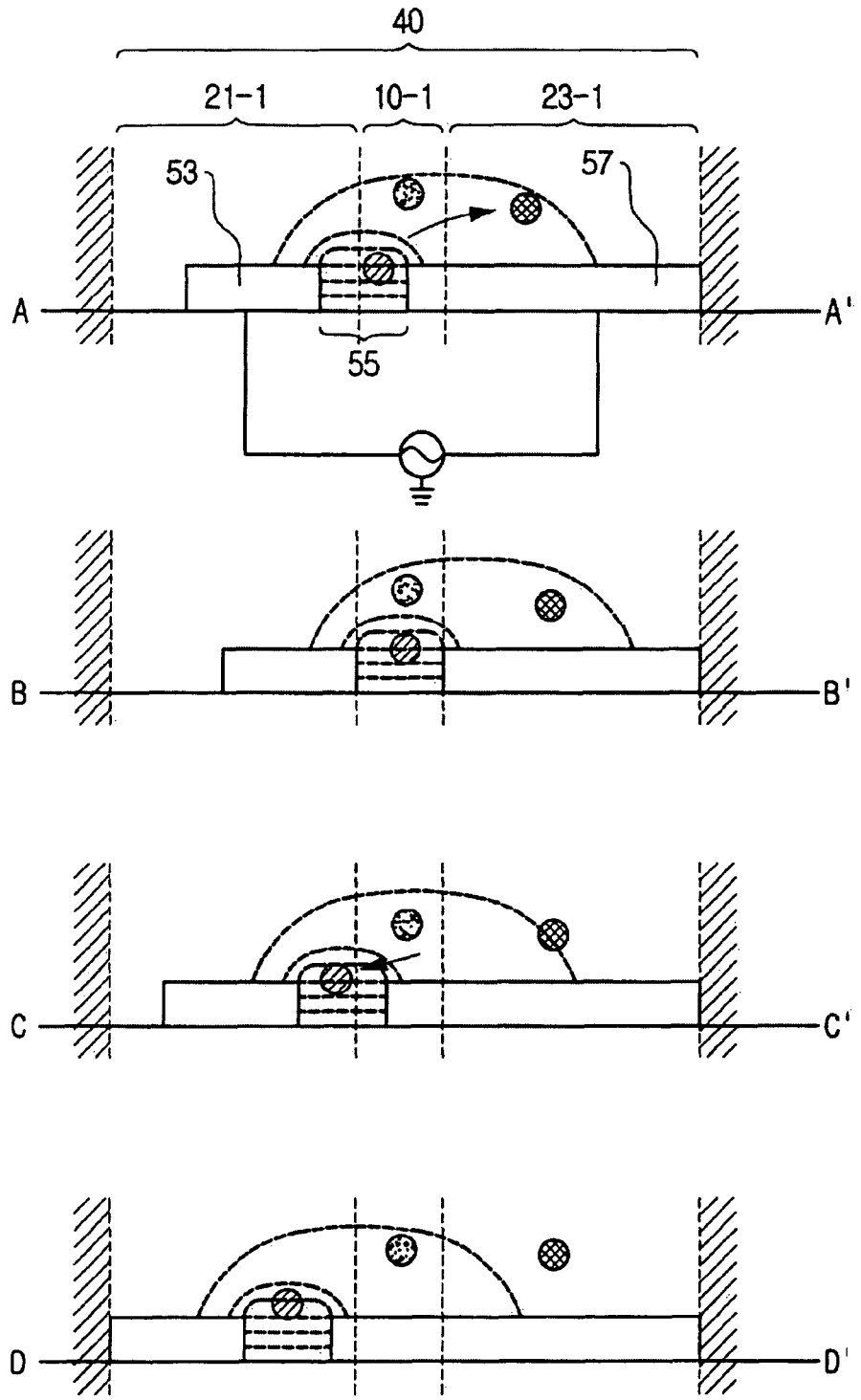
FIG. 3 is a sectional view illustrating an operational principle of the separating device.

FIG. 2 is a view illustrating a procedure of separating micro particles in a sample using the separating device illustrated in FIG. 1. FIG. 3 is a sectional view illustrating an operational principle of the separating device, wherein four sectional views thereof each are taken along lines A-A', B-B', C-C', and D-D', respectively of FIG. 2.

As illustrated in FIG. 2, a sample containing diverse kinds of micro particles is injected into the inlet 10. Here, the micro particles contained in the sample can be divided into (+) DEP particles, (−) DEP particles, and (zero) DEP particles having no DEP characteristic according to a dielectrophoresis (DEP) phenomenon.

In general, under an inhomogeneous electric field, dielectric particles in a solution exhibits a DEP behavior due to a difference in dielectric characteristic relative to a suspension medium so that the particles move toward high density field or low density field.

Figure 4:
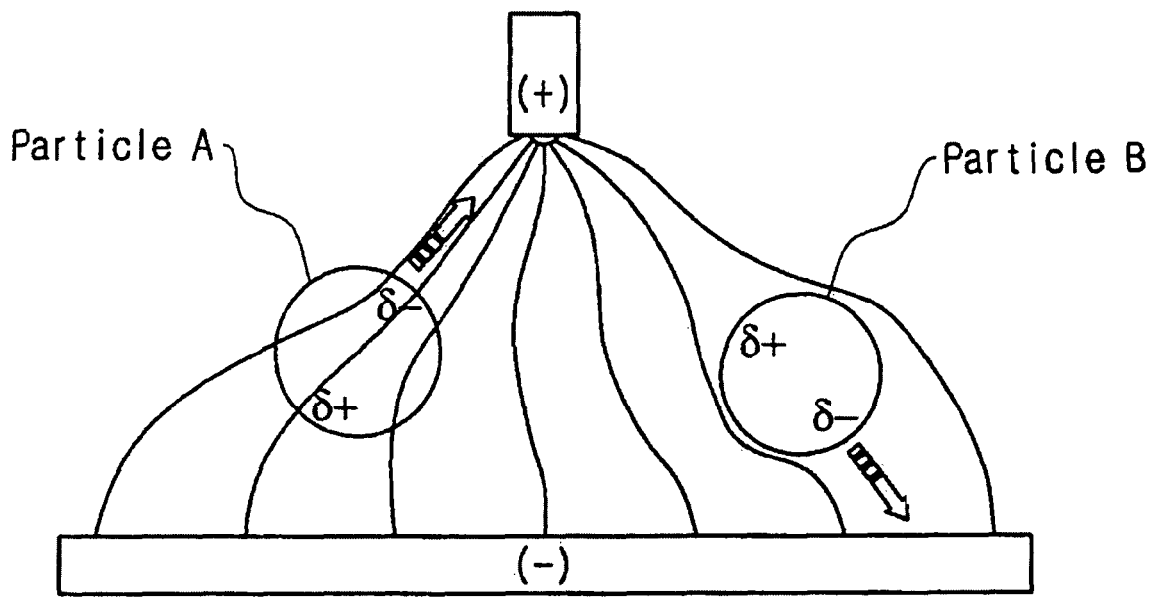
FIG. 4 is a view illustrating a property of the micro particles according to a dielectrophoresis (DEP) phenomenon.

FIG. 4 is a view illustrating a property of the micro particles according to the DEP phenomenon. In FIG. 4, a particle A is a (+) DEP particle that will move toward high density field, and a particle B is a (−) DEP particle that will move toward low density field. A (zero) DEP particle that has no DEP characteristic remains on its position irrespective of a density of electric field. The DEP characteristic is an inherent property of a particle varying according to a dielectric characteristic of a medium and a particle, and power frequency applied.

A procedure of separating micro particles in a sample using the separating device illustrated in FIG. 1B is as follows: When the sample is injected into the channel 40 through the inlet 10, as shown in an A-A' sectional view of FIG. 3, the sample passes through part of the electrode gap 55 and part of the second electrode 57. Here, (+) DEP particles move toward the electrode gap 55 with high density electric field, (−) DEP particles move toward the second electrode 57 with low density electric field, and (zero) DEP particles move forward while maintaining its initial injection position 10-1 through the inlet 10, i.e., directing along a flow path formed between fluids 21-1, 23-1 flowing along the sides of the channel to form the flow sheath of the sample.

Then, in the process of passing through the positions of the B-B', C-C', and D-D' sections, the (+) DEP particles move along a path of the electrode gap 55 with high density field, and then flow out through the first outlet 31 at the end of a moving direction of the electrode gap. Meanwhile, the (−) DEP particles move toward the second electrode 57 with low density field, and then flow out through the second outlet 33 at the side where the second electrode is installed. The (zero) DEP particles having no DEP characteristic continuously move along an initial introduction direction through the inlet 10 and then flow out through the third outlet 35.

Thus, the separating device of the invention allows the micro particles to be separated and discharged out through the first, second, and third outlets 31, 33, and 35, respectively according to the inherent DEP characteristic of the micro particles.

The second electrode 57 provided in the channel 40 has a width (W2 in FIG. 1A) larger than the width (W1 in FIG. 1A) of the first electrode 53 as well as than the width (G in FIG. 1A) of the electrode gap 55. In this case, upon the application of AC power with certain frequency between the first electrode 53 and the second electrode 57, low density electric field is provided on the second electrode 57, and high density electric field is provided on the electrode gap 55.

The first electrode 53 preferably has a width between 10 μm and 50 μm, the second electrode 57 preferably between 30 μm and 300 μm, and the electrode gap between 2 μm and 50 μm.

Figure 5:
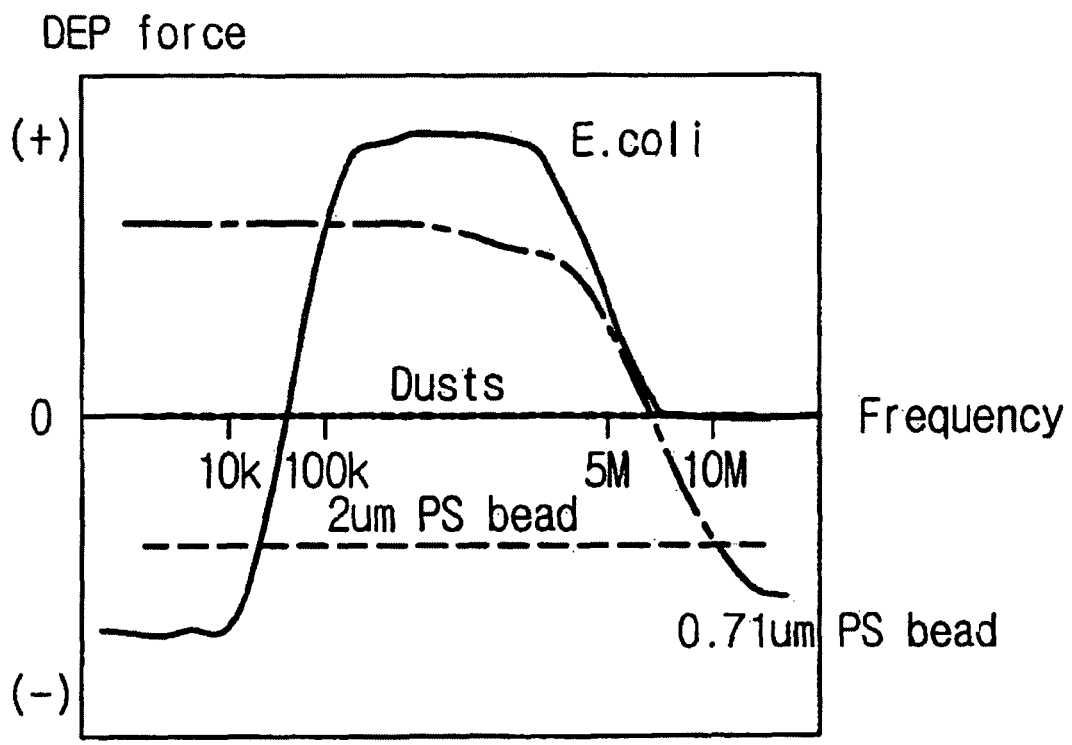
FIG. 5 is a graphical diagram illustrating a DEP characteristic of diverse kinds of micro particles relative to power frequency in deionized water.

FIG. 5 is a graphical diagram illustrating a DEP characteristic of diverse kinds of micro particles relative to power frequency in deionized water. Utilizing the DEP characteristic illustrated in FIG. 5, particles with different DEP characteristics can be easily separated.

For example, electric power with 100 kHz to 5 KHz is applied in deionized water so that E. coli with (+) DEP characteristic, 2 μm polystyrene (PS) beads with (−) DEP characteristic, and dusts with (zero) DEP characteristic can be easily separated within the frequency range.

Further, electric power with 10 kHz or less is applied in deionized water so that 0.71 μm PS beads with (+) DEP characteristic, E. coli with (−) DEP characteristic, and dusts with (zero) DEP characteristic can be easily separated within the frequency range.

FIGS. 6A to 6E are views illustrating a method of fabricating the separating device according to the first embodiment of the present invention.

Figure 6A:
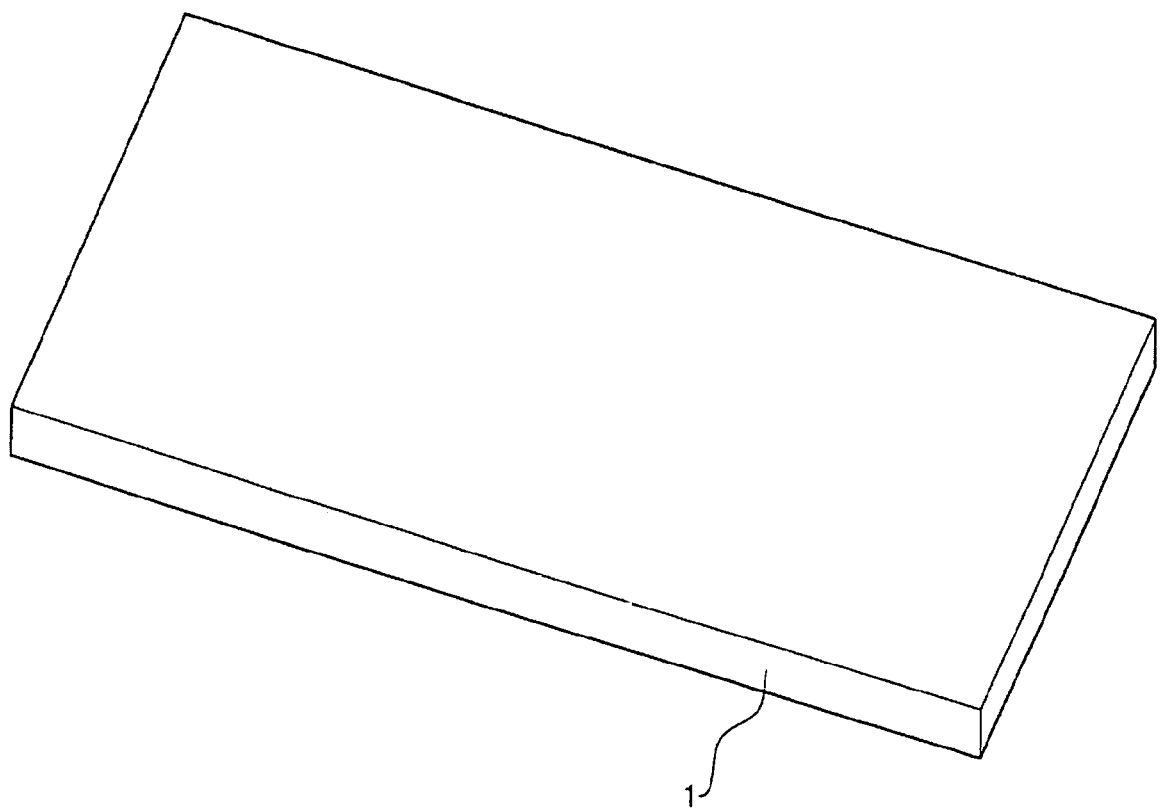

First, as illustrated in FIG. 6A, a lower substrate 1 composed of single crystal silicon, plastic or glass is prepared.

Figure 6B:
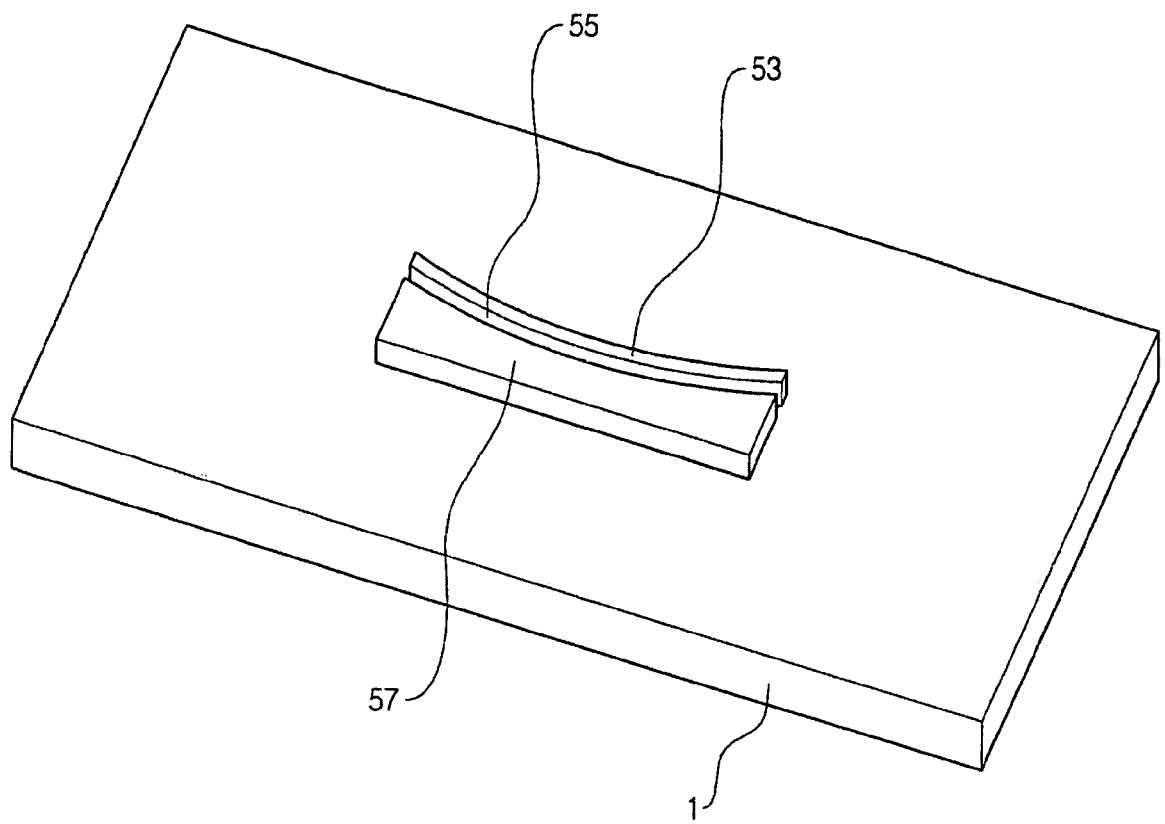

Then, as illustrated in FIG. 6B, a first pair of electrodes comprising a first electrode 53 and a second electrode 57 is formed on the lower substrate 1 so as to create an electric field in a channel so that the micro particles flowing through the channel can be separated according to the DEP characteristic.

For instance, the first electrode 53 and the second electrode 57 are formed in such a manner that a metal layer such as Au, Pt, Al, or Pd is deposited on the lower substrate 1 using an E-beam radiation or a sputtering method, and the resultant layer is patterned using wet or dry etching.

Herein, the first and second electrodes 53 and 57 are longitudinally provided in parallel in the channel 40 such that an electrode gap 55 between the electrodes 53 and 57 is curved. Contacts (not shown) are provided at the outside of the lower substrate 1 so as to apply AC power with certain frequency to the first and second electrodes 53, 57 from outside through the contacts.

Then, a channel layer 2 is provided on the lower substrate 1 such that it has a sample inlet 10 into which a sample containing micro particles is injected; fluid inlets 21, 23 into which fluid is injected to form a flow sheath of the sample; a plurality of outlets 31, 33, and 35 through which the micro particles are separated and discharged out; and a channel 40 through which the sample and the fluid flow. The channel layer 2 having the inlet 10, fluid inlets 21 and 23, the outlets 31, 33, and 35, and the channel 40 may be for example prepared in such a way that polymer material is spin-coated in a thickness of about 10 µm to 100 µm on the lower substrate 1 to form a thin film, and the resultant layer is patterned using a photolithography or a dry etching.

Next, as illustrated in FIG. 6D, an upper substrate 3 composed of single crystal silicon, plastic or glass is prepared so as to cover the channel layer 2. The upper substrate 3 is provided with holes 10-2, 21-2, 23-2, 31-2, 33-2, 35-2 each of which corresponds to the sample inlet 10, the fluid inlets 21, 23, and the outlets 31, 33, 35 of the channel layer 2.

Next, as illustrated in FIG. 6E, the upper substrate 3 is placed on the channel layer 2 to cover, and both are bonded together. Then, tubes 10-3, 21-3, 23-3, 31-3, 33-3, 35-3 are respectively installed on the holes 10-2, 21-2, 23-2, 31-2, 33-2, 35-2 as illustrated in FIG. 6D. Through the tubes, the sample and the fluid are easily injected into the device, and the separated particles are easily discharged from the device.

FIG. 7 is a sectional view taken along line X-X' of the separating device shown in FIG. 6E.

In the separating device according to the first embodiment of the present invention, the first pair of electrodes comprising the first and second electrodes 53 and 57 for creating an electric field is provided on the bottom of the channel 40. In such a construction, a pair of electrodes is further provided on the ceiling of the channel so that the micro particles flowing through the channel 40 can flow at a middle depth of the channel 40. In such a case, it prevents the micro particles from colliding against the bottom or the ceiling of the channel 40.

Figure 8:
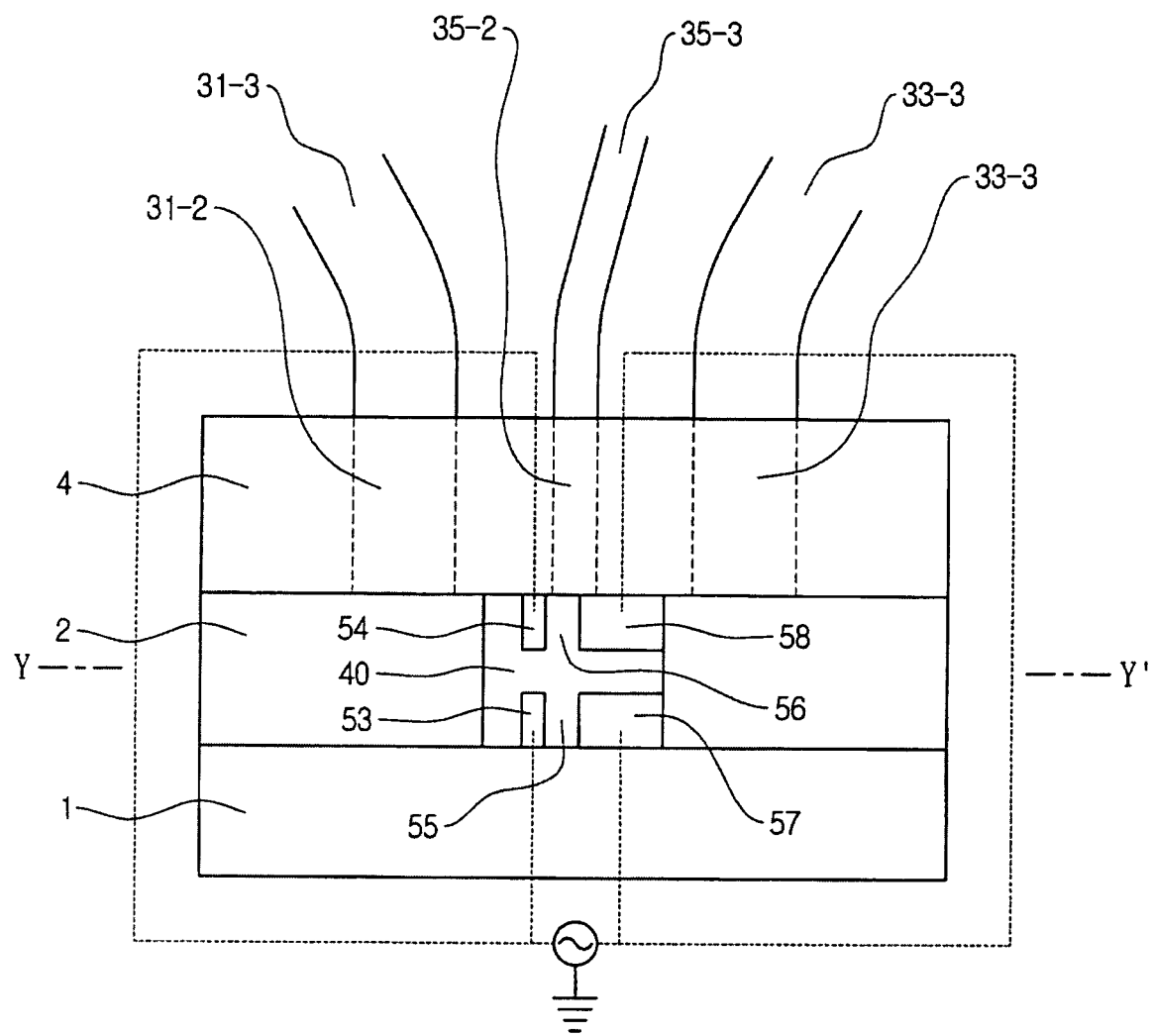
FIG. 8 is a sectional view illustrating a separating device of micro particles according to a second embodiment of the present invention.

FIG. 8 is a sectional view illustrating a device for separating micro particles according to a second embodiment of the present invention as constructed above. As illustrated in FIG. 8, the device further includes a second pair of electrodes comprising a third electrode 54 and a fourth electrode 58 on the ceiling (i.e., the lower surface of the upper substrate 4) of the channel 40.

Like the first and second electrodes 53 and 57, the third and fourth electrodes 54 and 58 are longitudinally disposed in parallel in the channel 40 such that an electrode gap 56 between the third and fourth electrodes 54 and 58 is curved.

Here, it is preferable that both the pairs of electrodes 54, 58; and 53, 57 be symmetric with each other relative to a horizontal plane (Y-Y' plane) of the channel 40.

Figure 9:
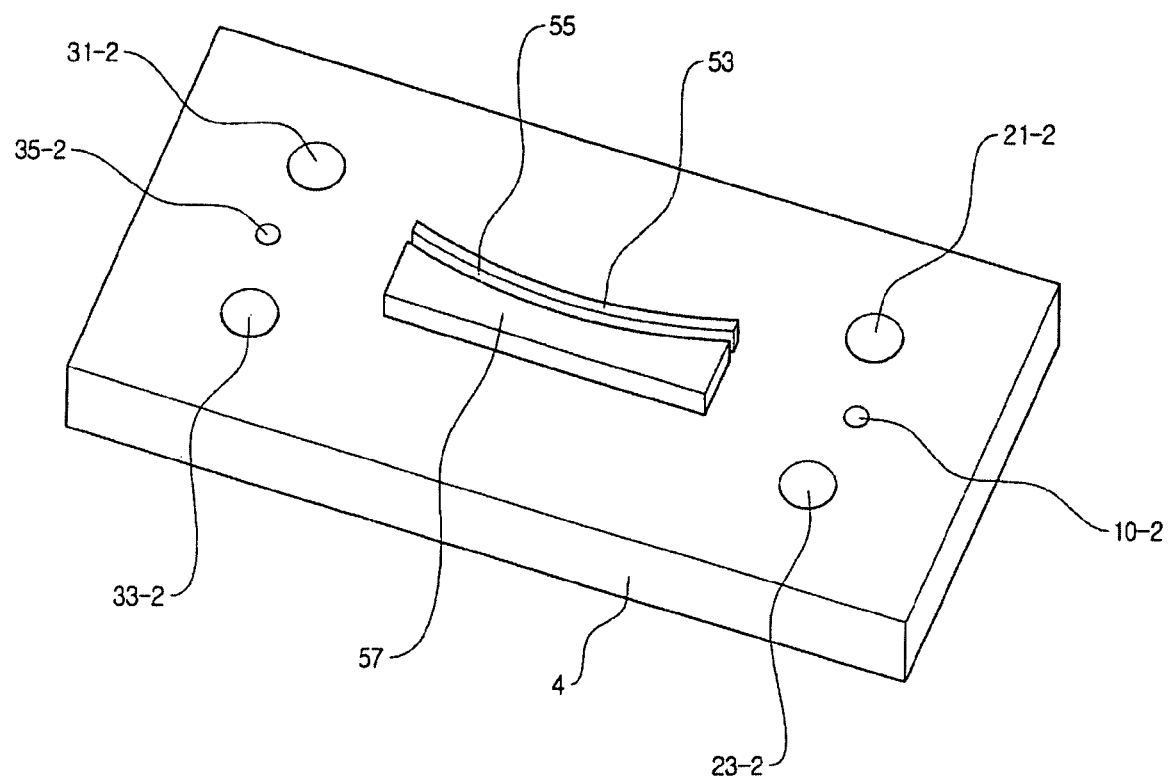
FIG. 9 is a perspective view illustrating an upper substrate of the separating device of micro particles according to the second embodiment of the present invention.

In order to fabricate the separating device as constructed above, the third and fourth electrodes 54 and 58 having the same shape and dimensions as those of the first and second electrodes 53 and 57 according to the first embodiment of the present invention are provided on the upper substrate 4 in the same manner as that of the first embodiment. That is, the third electrode 54 and the fourth electrode 58 are formed in such a manner that a metal layer such as Au, Pt, Al, or Pd is deposited on the upper substrate 4 using an E-beam radiation or a sputtering method, and the resultant layer is patterned using wet or dry etching. FIG. 9 is a perspective view illustrating the upper substrate 4 formed as such.

Figure 6C:
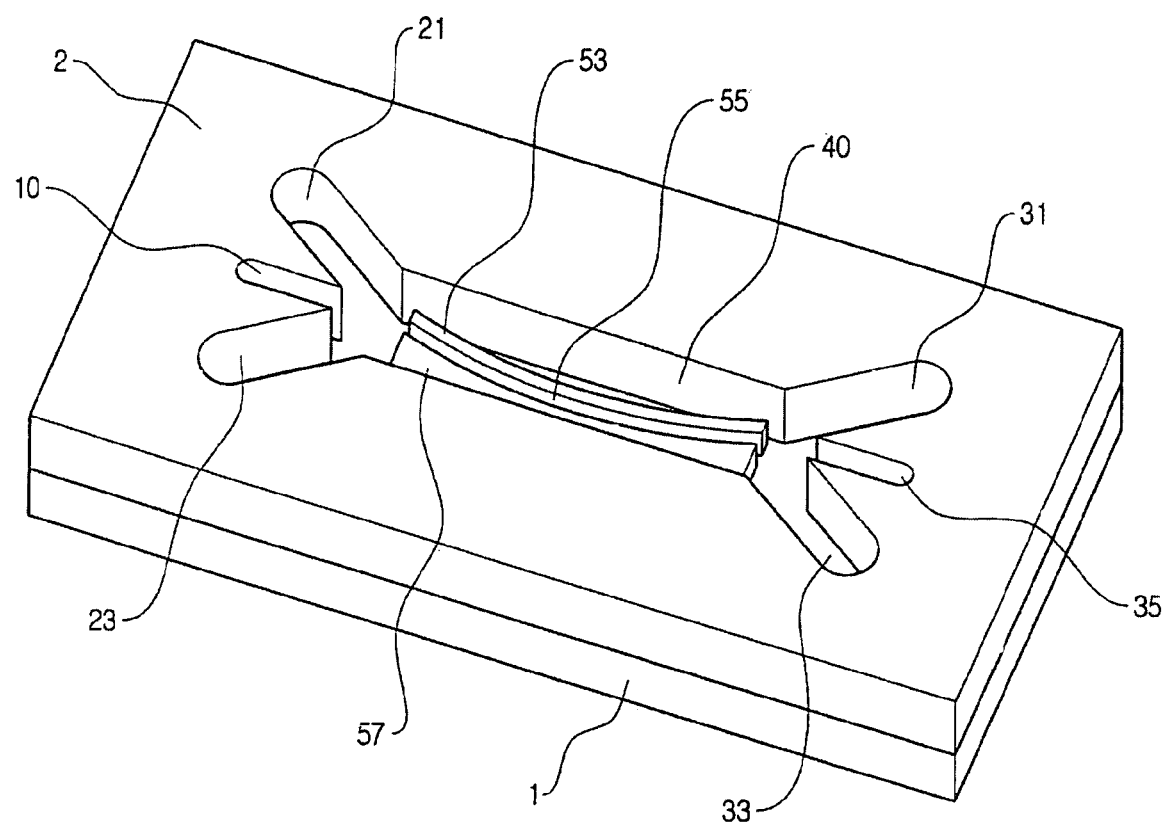

Next, as illustrated in FIG. 6C, the upper substrate 4 illustrated in FIG. 9 is bonded to the channel layer 2, which is formed on the lower substrate 1, thereby preparing the device according to the second embodiment of the present invention.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of separating micro particles in a sample, comprising the steps of:
    (a) flowing a sample containing micro particles into a device for separating micro particles, the device comprising: (i) a sample inlet into which a sample containing micro particles is injected; (ii) fluid inlets into which fluid is injected to form a flow sheath for the sample; (iii) a plurality of outlets through which the micro particles are separated and discharged out; (iv) a channel through which the sample and the fluid flow; and (v) a first pair of electrodes comprising a first electrode and a second electrode longitudinally disposed in parallel in the channel,
    wherein
    the first and second electrodes are provided in such a manner that an electrode gap between the first and second electrodes has a curved shape;
    an end portion of the electrode gap is angled with respect to a longitudinal axis of the channel; and
    the plurality of outlets comprise a first outlet positioned in an extending direction of the electrode gap, a second outlet connected to a portion of the channel where the second electrode is positioned, and a third outlet positioned in an extending direction of the channel; and
    (b) applying an electric field between the first electrode and the second electrode.

2. The method according to claim 1, wherein the second electrode has a width larger than a width of the electrode gap and than a width of the first electrode.

3. The method of claim 1 further comprising
    (a) collecting the micro particles flowing along a path of an electrode gap between the first and second electrodes;
    (b) collecting, at the end of the second electrode side, the micro particles flowing toward the second electrode; or
    (c) collecting the micro particles flowing along a flow path of the sample in the channel.

4. A device for separating micro particles, comprising:
    a sample inlet into which a sample containing micro particles is injected;
    fluid inlets into which fluid is injected to form a flow sheath for the sample;
    a plurality of outlets through which the micro particles are separated and discharged out;
    a channel through which the sample and the fluid flow; and
    a first pair of electrodes comprising a first electrode and a second electrode longitudinally disposed in parallel in the channel,
    wherein
    the first and second electrodes are provided in such a manner that an electrode gap between the first and second electrodes has a curved shape,
    an end portion of the electrode gap is angled with respect to a longitudinal axis of the channel, and
    the plurality of outlets comprise a first outlet positioned in an extending direction of the electrode gap, a second outlet connected to a portion of the channel where the second electrode is positioned, and a third outlet positioned in an extending direction of the channel.

5. The device according to claim 4, wherein the second electrode has a width larger than a width of the electrode gap and than a width of the first electrode.

6. The device according to claim 4, wherein the channel has dimensions of height between 10 μm and 100 μm, width between 200 μm and 2 mm, and a length between 5 mm and 20 mm.

7. The device according to claim 4, wherein the first electrode has a width between 10 μm and 50 μm, the second electrode has a width between 30 μm and 300 μm, and the electrode gap has a width between 2 μm and 50 μm.

8. The device according to claim 4, wherein the sample injected through the sample inlet passes through part of the electrode gap and through a portion of the channel above part of the second electrode.

9. The device according to claim 4, wherein the device comprises an upper substrate, a channel layer, and a lower substrate, and wherein the channel layer is provided with the sample inlet, the fluid inlets, the plurality of outlets, and the channel.

10. The device according to claim 9, wherein the upper substrate is provided with holes respectively corresponding to the sample inlet, the fluid inlets, and the outlets of the channel layer.

11. The device according to claim 4, wherein the first electrode and the second electrode are provided on the bottom of the channel.

12. The device according to claim 11, further comprising a second pair of electrodes comprising a third electrode and a fourth electrode on the ceiling of the channel, wherein the third and fourth electrodes are provided in such a manner that an electrode gap between the third and fourth electrodes has a curved shape.

13. The device according to claim 12, wherein the first and second pairs of electrodes are symmetric with each other relative to a horizontal plane of the channel.

14. A method of fabricating a separating device for micro particles, the method comprising the steps of:
  (a) forming a first pair of electrodes comprising a first electrode and a second electrode on a first substrate;
  (b) forming, on the first substrate, a channel layer having a sample inlet into which a sample containing micro particles is injected, fluid inlets into which fluid is injected to form a flow sheath for the sample, a plurality of outlets through which the micro particles are separated and discharged out, and a channel through which the sample and the fluid flow; and
  (c) placing a second substrate on the channel layer and bonding the same together,
  wherein the first and second electrodes are provided in such a manner that the first and second electrodes are longitudinally disposed in parallel in the channel, and that an electrode gap between the first and second electrodes has a curved shape;
  an end portion of the electrode gap is angled with respect to a longitudinal axis of the channel; and
  the plurality of outlets comprise a first outlet positioned in an extending direction of the electrode gap, a second outlet connected to a portion of the channel where the second electrode is positioned, and a third outlet positioned in an extending direction of the channel.

15. The method according to claim 14, wherein the steps (a) comprises the steps of: depositing a metal layer on the first substrate; and patterning the metal layer to form the first and second electrodes.

16. The method according to claim 14, wherein the step (b) comprises the steps of: forming the channel layer on the first substrate; and patterning the channel layer to form therein the sample inlet, the fluid inlets, the outlets, and the channel.

17. The method according to claim 14, wherein in the step (c), the second substrate is provided with holes respectively corresponding to the sample inlet, the fluid inlets, and the outlets of the channel layer.

18. The method according to claim 14, further comprising the step of forming a second pair of electrodes comprising a third electrode and a fourth electrode on the lower surface of the second substrate.

19. The method according to claim 18, wherein the third electrode and the fourth electrode are longitudinally provided in parallel in the channel, and wherein an electrode gap between the third and fourth electrodes has a curved shape.

20. The method according to claim 18, wherein the third and fourth pairs of electrodes are symmetric with each other relative to a horizontal plane of the channel.

* * * * *